H. A. WOOD.
VALVE CAP.
APPLICATION FILED NOV. 1, 1919.

1,397,027.

Patented Nov. 15, 1921.

INVENTOR
HENRY A. WOOD.
BY
ATTY'S

UNITED STATES PATENT OFFICE.

HENRY ALFRED WOOD, OF KINGSTON, ONTARIO, CANADA.

VALVE-CAP.

1,397,027.   Specification of Letters Patent.   Patented Nov. 15, 1921.

Application filed November 1, 1919. Serial No. 335,074.

*To all whom it may concern:*

Be it known that I, HENRY ALFRED WOOD, a subject of the King of Great Britain, a resident of the town of Kingston, Province of Ontario, Dominion of Canada, have invented certain new and useful Improvements in Valve-Caps, of which the following is a specification.

This invention relates to improvements in valve caps.

In the present practice valve caps are threaded on a nut which embraces the valve casing or sleeve and the objects of the present invention are to so construct the nut that it will coact with the improved valve cap, and in a case of emergency, such as the loss or mislaying of the improved valve cap, then the ordinary valve cap at present in use may be used on the same nut.

Further objects are to provide a simple and effective dust proof valve cap which will be held firmly in place and which may be secured in position or released therefrom either by a continuous rotation in one direction or by a rotation in a clockwise or anticlockwise direction.

The invention consists essentially of the improved construction hereinafter described in detail in the accompanying specification and drawings.

In the drawings:

Fig. 7 is a plan view of the lower open end of the valve cap.

Like characters of reference refer to like parts in the several figures.

Figure 2:
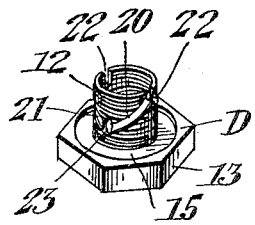
Fig. 2 is a perspective view of the nut or cap retaining member.

Referring to the drawings, A indicates a portion of a wheel, and B a valve sleeve or casing extending through the rim 10 and connected at one end to the inner tube C of a pneumatic tire. The valve casing or sleeve B having a cap 11 on the outer end, the parts so far enumerated being constructed in a manner well known in the art.

B represents a nut or retaining member comprising an internally screw threaded sleeve 12 which engages the outer screw threaded surface of the valve sleeve or casing B, the said nut being formed with an integral hexagonal flange 13 which facilitates tightening the nut in position with the flange bearing against the inner surface of the rim 10. The nut is formed with undercut recesses 14 and 15 on the top and bottom faces, designed to receive packing rings 16 and 17 and retain the same in position, the packing rings 17 being designed to engage with the rim 10 and tightly bear against the same.

The outer periphery of the sleeve 12 is formed with a thread which may be engaged by any ordinary type of valve cap at present in use. In accordance with the present invention the valve cap E is formed of spring material and of suitable size and shape to inclose the projecting outer end of the valve sleeve or casing, and the said cap is provided in the lower end with a flange, and on the inner wall with a pair of diametrically opposite and inwardly projecting studs 18 and 19 designed to enter the cam grooves 20 and 21 on the outer periphery of the sleeve 12.

Each cam groove 20 extends from an opening 22 at the top of the sleeve to a perforation or recess 23 formed near the bottom of the sleeve and intermediate of the distance between the openings 22, the recess 23 being elongated so that the upper portion will form a locking member for the projecting studs, as will be hereinafter explained.

Each cam groove 21 extends from the opening 22 at the top of the sleeve and in the opposite direction to the adjacent cam groove 20, the cam grooves 21 communicating with the perforations or recesses 23.

The cam grooves 20 and 21 extend in a spiral manner so that when the projections or studs 18 and 19 on the sleeve are inserted in the openings 22 and engage with the cam grooves, the cap will be moved down over the outer end of the valve casing or sleeve until the studs enter the cam grooves whereupon the dust proof cap E will be rotated in either direction depending on which grooves the studs engage, until the projecting studs 18 and 19 engage with the recess 23 when the cap will be forced slightly outwardly, so that the projecting studs will be located in the upper elongated portion of the recess 23, thus locking the cap in position.

It will be understood that the rotation given to the cap E moves the same into further engagement with the nut D and compresses the rubber washer 16 forming a dust proof joint and when the projecting studs 18 and 19 have engaged the recesses 23, the rubber washer 16 will expand and force the dust proof cap E upwardly against its pressure direction, and in this way the projecting studs 18 and 19 will move into the upper portion of the elongated recess 23.

It will be evident that the dust proof cap E will be held firmly in this position until it is manually removed.

The operation of securing the cap E in assembled position on the nut D only necessitating the cap being rotated through one-quarter of a turn in either direction.

Figure 3:
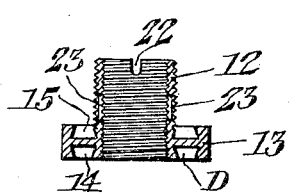
Fig. 3 is a sectional view of the nut or cap retaining member.
Figure 4:
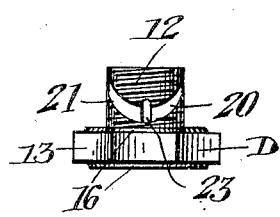
Fig. 4 is a side view of the nut or cap retaining member.
Figure 5:
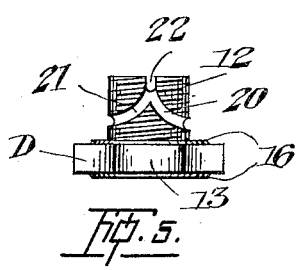
Fig. 5 is a side view of the nut or cap retaining member taken at right angles to that shown in Fig. 4.
Figure 6:
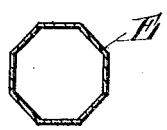
Fig. 6 is a transverse section of the cap on the line 2—2 of Fig. 1.
Figure 1:
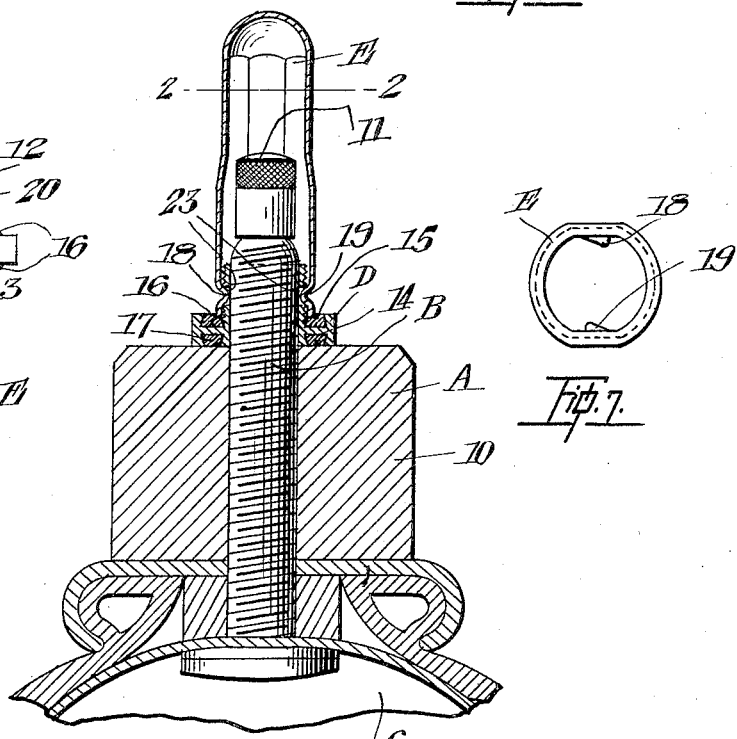
Figure 1 is a cross sectional view showing the valve cap in position on a valve casing or sleeve.

From Figs. 2 to 5 it will be evident that the cap E may after the projections 18 and 19 have been engaged with the openings 22 be rotated in either a clockwise or anti-clockwise direction causing the cap E to be tightened on the washer 16 of the nut D and form a dust proof joint.

To remove the cap E it is only necessary to manually force the cap E down on the washer 16 of the nut D and then turn the cap in either direction one-quarter of a turn when it will be freed from the valve. The washers 16 and 17 are by undercutting the wall of the recesses in the nut D, prevented from falling out. The cap E is locked against the resilient washer 16 and firmly held in position rendering the cap dust proof and incapable of becoming detached by jarring or vibration and an externally applied manual force is necessary to remove the cap.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A cap for valve stand comprising a flange sleeve adapted to engage the stem of the valve and provided with a continuous cam groove having a central inner portion and having outer portions opening at the outer edge of the sleeve, the central portion of the cam groove having a recess therein and a cap having an inwardly disposed projection designed to co-act with the groove and adapted to engage in the recess, the said cap being capable of being tightened on the sleeve and released by continuous turning motion in one direction, being adapted to be held at central position in the cam groove by engagement between the projection and recess.

In witness whereof I have hereunto set my hand in the presence of two witnesses.

HENRY ALFRED WOOD.

Witnesses:
 KEITHS MARGUERITE LLOYD,
 NORA BEAUPLIE BAIDEN.